United States Patent
Nakano et al.

(10) Patent No.: US 8,994,806 B2
(45) Date of Patent: *Mar. 31, 2015

(54) MICROSCOPE APPARATUS CHRONOLOGICALLY STORING DIFFERENT TYPES OF IMAGE INFORMATION

(75) Inventors: Mitsuhiro Nakano, Tokyo (JP); Tatsuo Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 12/828,342

(22) Filed: Jul. 1, 2010

(65) Prior Publication Data

US 2011/0001815 A1 Jan. 6, 2011

(30) Foreign Application Priority Data

Jul. 6, 2009 (JP) ................. 2009-159721

(51) Int. Cl.
*H04N 7/18* (2006.01)
*G02B 21/36* (2006.01)

(52) U.S. Cl.
CPC .................... *G02B 21/367* (2013.01)
USPC .......................................................... 348/79

(58) Field of Classification Search
CPC .......... H04N 7/18; G02B 21/00; G02B 21/36; G02B 21/367
USPC ..................... 348/79; 359/368, 369
See application file for complete search history.

(56) References Cited

U.S. PATENT DOCUMENTS

| 6,078,681 | A | 6/2000 | Silver |
| 6,337,474 | B1 | 1/2002 | Morizono |
| 7,078,663 | B2 * | 7/2006 | Takamizawa ............... 250/201.3 |
| 7,986,824 | B2 | 7/2011 | Suzuki et al. |
| 8,139,106 | B2 | 3/2012 | Maiya |

(Continued)

FOREIGN PATENT DOCUMENTS

| DE | 20 2008 004271 U1 | 5/2008 |
| JP | 2005-449397 A | 6/2005 |

(Continued)

OTHER PUBLICATIONS

CCD based pH Imaging Sensor, Mimura et al, Electron Devices Meeting, 1997. IEDM '97. Technical Digest., International, pp. 915-918.*

(Continued)

*Primary Examiner* — Jay Patel
*Assistant Examiner* — Francis G Geroleo
(74) *Attorney, Agent, or Firm* — Holtz, Holtz, Goodman & Chick PC (57) ABSTRACT

A microscope apparatus organizes and stores a plurality of types of image information acquired by a plurality of image acquisition methods at different timings. The microscope apparatus includes a time counting unit for counting time, a plurality of different image acquisition units, and a storage unit for storing image information, when acquired by any one of the image acquisition units, and timing information counted by the time counting unit, by having them associated with each other. Even if the image acquisition units acquire different types of image information at different timings, the timing information can be used to call up the image information stored in the storage unit in a chronological order.

6 Claims, 7 Drawing Sheets

(56) References Cited

U.S. PATENT DOCUMENTS

| | | |
|---|---|---|
| 8,280,142 B2 | 10/2012 | Suzuki et al. |
| 8,520,213 B2 | 8/2013 | Popescu et al. |
| 2007/0070498 A1* | 3/2007 | Endo et al. ............... 359/434 |
| 2009/0290156 A1 | 11/2009 | Popescu et al. |
| 2011/0049370 A1 | 3/2011 | Yoshida et al. |
| 2012/0141036 A1 | 6/2012 | Yamashita |

FOREIGN PATENT DOCUMENTS

| | | |
|---|---|---|
| JP | 2008139487 A | 6/2008 |
| JP | 2008139488 A | 6/2008 |
| JP | 2009232980 A | 10/2009 |
| WO | WO 2006/106882 A1 | 10/2006 |

OTHER PUBLICATIONS

Extended European Search Report dated Nov. 25, 2010 (in English) in counterpart European Application 10006630.7.

Related U.S. Appl. No. 13/308,731; First Named Inventor: Yusuke Yamashita ; Title: "Observation Apparatus and Observation Method"; filed Dec. 1, 2011.

Japanese Office Action dated Jul. 9, 2013 issued in counterpart Japanese Application No. 2009-159721.

* cited by examiner

MICROSCOPE APPARATUS CHRONOLOGICALLY STORING DIFFERENT TYPES OF IMAGE INFORMATION

BACKGROUND OF THE INVENTION

1. Field of the Invention

The present invention relates to a microscope apparatus.

This application is based on Japanese Patent Application No. 2009-159721, the content of which is incorporated herein by reference.

2. Description of Related Art

Heretofore, there is known a microscope apparatus which makes an association of a plurality of image data acquired by different observation methods with each other and stores them as a single image data file (for example, refer to Japanese Unexamined Patent Application, Publication No. 2005-149397).

However, this microscope apparatus involves an inconvenient situation in which the acquirable image data by different observation methods are limited only to those acquired at the same time, and it is not possible to process a plurality of images if acquired by different image acquisition methods at different timings.

BRIEF SUMMARY OF THE INVENTION

The present invention provides a microscope apparatus capable of organizing and storing a plurality of types of image information acquired by a plurality of image acquisition methods at different timings.

One aspect of the present invention is a microscope apparatus comprising a time counting unit for counting time, a plurality of different image acquisition units, and a storage unit for storing image information, when acquired by any one of the image acquisition units, and timing information counted by the time counting unit, by having them associated with each other.

According to the above-mentioned aspect of the present invention, different types of image information acquired by the plurality of different image acquisition units are stored in association with a common time line counted by the time counting unit, in the storage unit. Therefore, even if the image acquisition units acquire different types of image information at different timings, it is possible, by using the timing information as a clue, to call up the image information stored in the storage unit in a chronological order. For example, if a Laser Scanning Microscope device ("LSM") moves a laser beam to scan an object by using a scanner and detects fluorescent light therefrom and a Charge Coupled Device ("CCD") which captures two dimensional images of the object are provided as the image acquisition units, although the respective images are acquired at different timings, the respective images can be stored in association with a same type of timing information along a single time line, by which these images can be observed in mutual relation with each other.

In the above-mentioned aspect, the storage unit may also separately store image information acquired by each of the image acquisition units and timing information counted by the time counting unit at the time when the concerned image information has been acquired, by respectively providing them with each serial number and each identification information which indicates the type of the image acquisition unit that has acquired the image information.

By so doing, similarly to the case where the image information is stored in direct association with the timing information, images can be observed through indirect association between the image information and the timing information by using the serial number and the identification information which indicates the type of the image acquisition unit.

In addition, in the above-mentioned aspect, the storage unit may also collectively store image information acquired by the image acquisition units and collectively store timing information counted by the time counting unit at the time when the concerned image information has been acquired, by respectively providing them with each serial number and each identification information which indicates the type of the image acquisition unit that has acquired the image information.

Moreover, in the above-mentioned aspect, the storage unit may also store pairs of image information acquired by each of the image acquisition units and timing information counted by the time counting unit at the time when the concerned image information has been acquired, in an arrangement according to the order of the timing information.

Furthermore, the above-mentioned aspect may also comprise an image display unit for displaying the image information, an image specifying unit for specifying a certain type of image information displayed on the image display unit, and an image retrieval unit for retrieving, based on the timing information stored in association with the concerned type of image information specified by the image specifying unit, a different type of image information acquired by a different image acquisition unit other than the image acquisition unit that has acquired the specified type of image information, so that the image display unit displays the different type of image information retrieved by the image retrieval unit.

By so doing, if a certain type of image is specified by the image specifying unit during a state where the concerned type of image information is being displayed by the image display unit, the image retrieval unit retrieves a different type of image information acquired by a different image acquisition unit by using, as a clue, the timing information stored in association with the specified type of image information, and the different type of image information is displayed by the image display unit. By so doing, different types of related image information acquired by different image acquisition units can be readily called up, displayed, and observed.

The present invention can offer an effect of enabling to organize and store a plurality of types of image information acquired by a plurality of image acquisition methods at different timings.

DETAILED DESCRIPTION OF THE INVENTION

Hereunder is a description of a microscope apparatus 1 according to one embodiment of the present invention with reference to drawings.

Figure 1:
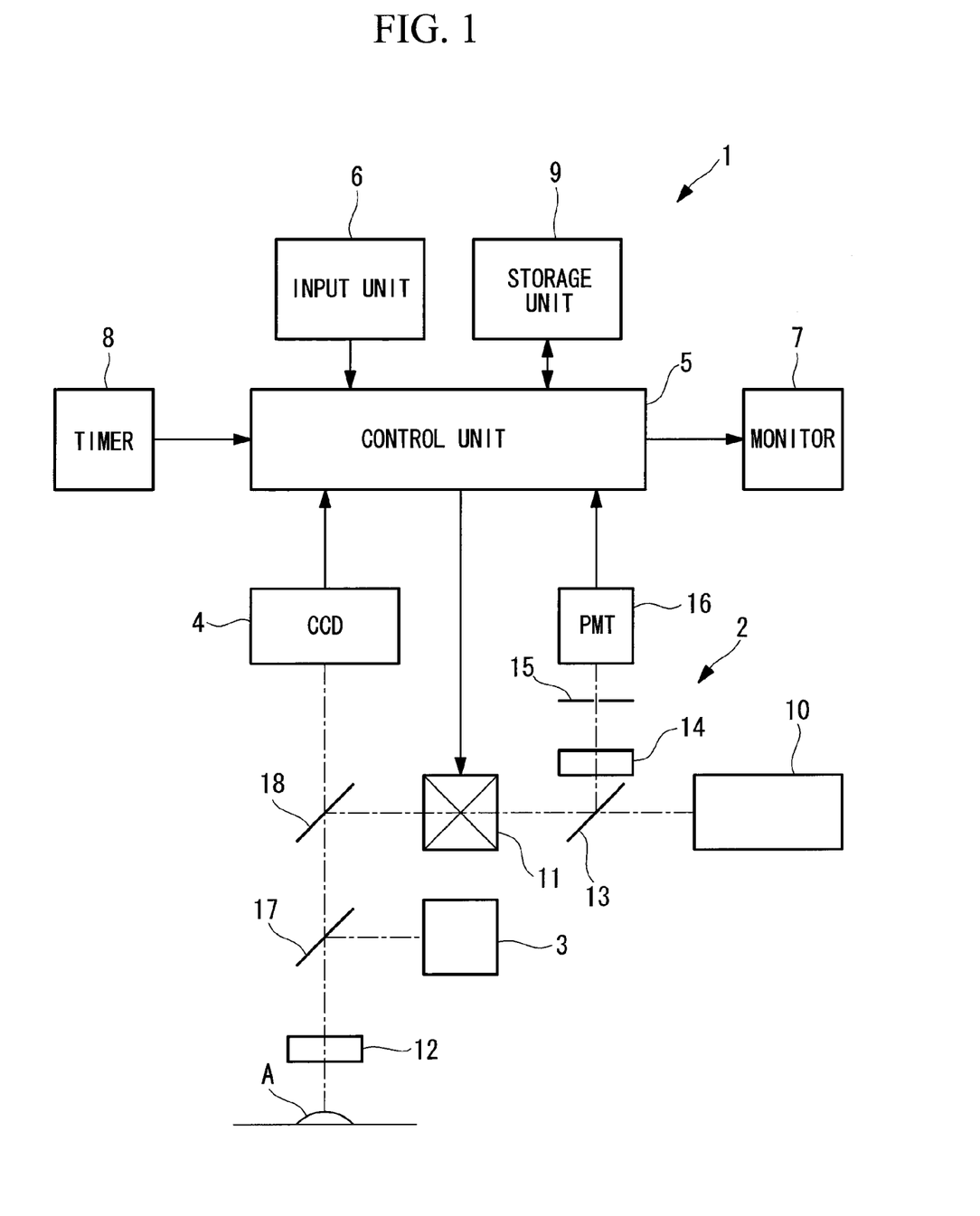
FIG. 1 is a block diagram showing a microscope apparatus according to one embodiment of the present invention.

As shown in FIG. 1, the microscope apparatus 1 of this embodiment comprises an LSM device 2, a planar illumination light source 3 attached to the LSM device 2, a CCD (imaging part, image acquisition unit) 4, a control unit (image retrieval unit) 5 for controlling the LSM device 2 and the CCD 4, an input unit (image specifying unit) 6 for entering inputs into the control unit 5, a monitor (image display unit) 7 for displaying images or such information acquired by the LSM device 2 and the CCD 4, a timer (time counting unit) 8 for counting the observation time, and a storage unit 9 for storing image information and other information acquired by the LSM device 2 and the CCD 4.

The LSM device 2 is a confocal microscope comprising: a laser light source 10 for emitting a laser beam; a scanner 11 for moving the laser beam emitted from the laser light source 10 to scan in a two dimensional manner; an object lens 12 for focusing the laser beam moved by the scanner 11 on a specimen A and collecting fluorescent light generated in the specimen A; a dichroic mirror 13 for branching the fluorescent light that has been collected by the object lens 12 and is returning back through the scanner 11, out from the optical path of the laser beam; a condenser lens 14 for condensing the fluorescent light branched out by the dichroic mirror 13; a confocal pinhole 15 positioned at the focal point of the condenser lens 14; and a photodetector (PMT: photomultiplier tube, image acquisition unit) 16 for detecting the fluorescent light passing through the confocal pinhole 15. In the drawing, the reference signs 17 and 18 denote dichroic mirrors.

The scanner 11 is, for example, a so-called proximal galvano mirror comprising a pair of independently oscillatable galvano mirrors (not shown). The control unit 5 makes a command to the scanner 11 regarding the position to irradiate the laser beam so that the scanner 11 can drive the respective galvano mirrors to be arranged at an appropriate oscillation angle according to the command from the control unit 5.

In addition, when receiving fluorescence brightness information from the photodetector 16 of the LSM device 2, the control unit 5 sequentially stores the brightness information in association with the position and the oscillation angle of the scanner 11, so as to thereby generate two-dimensional LSM image information.

Moreover, when receiving a picture signal from the CCD 4, the control unit 5 generates two-dimensional CCD image information to be displayed on the monitor 7.

Figure 2:
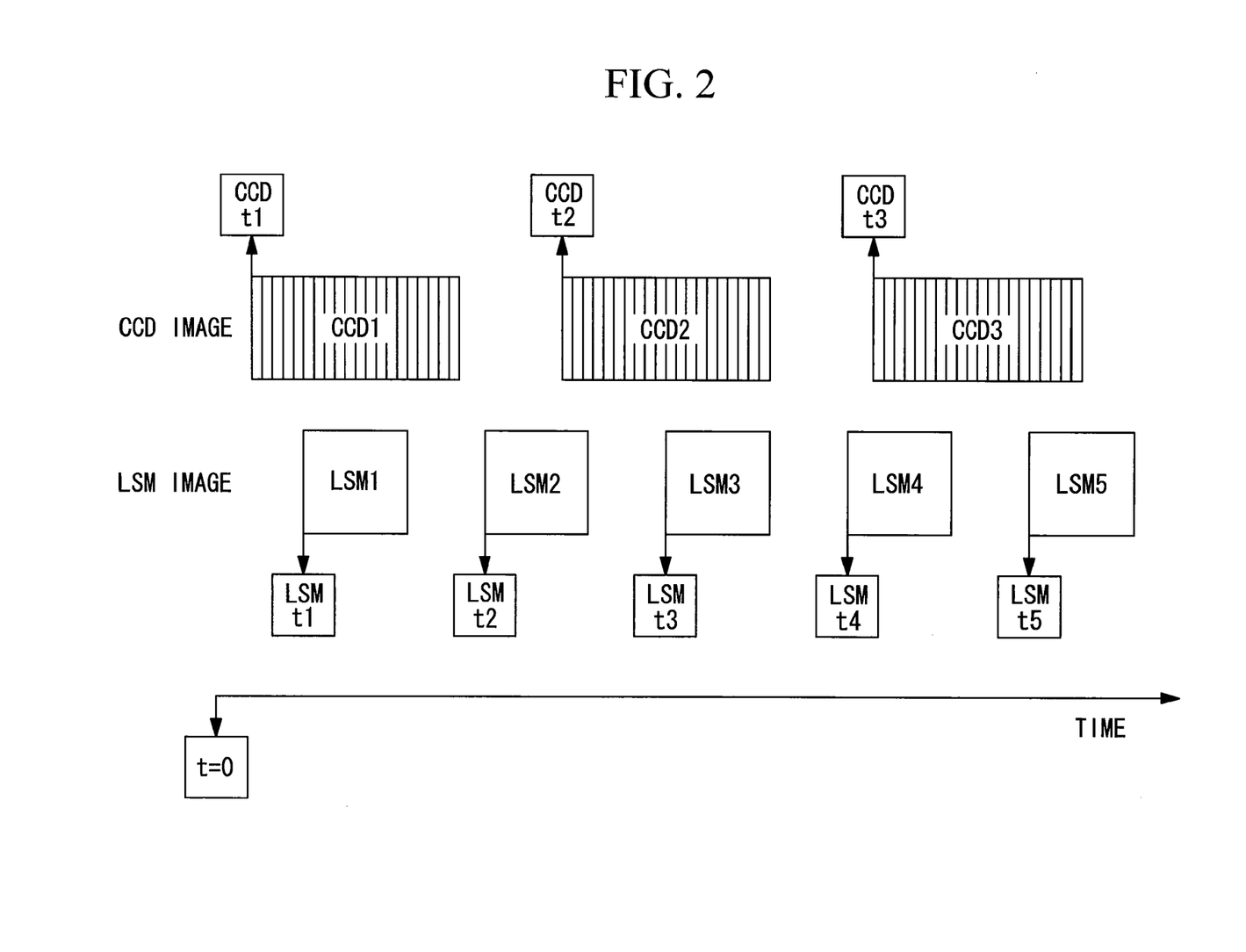
FIG. 2 is a time chart showing an example of image information acquired by the microscope apparatus of FIG. 1.

Furthermore, as shown in FIG. 2, when the reception of the picture signal from the CCD 4 is started, the control unit 5 starts to associate the timing information t received from the timer 8 at the same time of the reception, with the generated CCD image information. Similarly, when the reception of the fluorescence brightness information from the PMT 16 of the LSM device 2 is started, the control unit 5 starts to associate the timing information t received from the timer 8 at the same time of the reception, with the generated LSM image information.

In FIG. 2, the CCD image information is composed of a set of frames which respectively comprises a plurality of two-dimensional images, while the LSM image information is respectively composed of a single two-dimensional image.

The timer 8 starts to count the time in response to the observation start command which has been input from the input unit 6.

Figure 3:
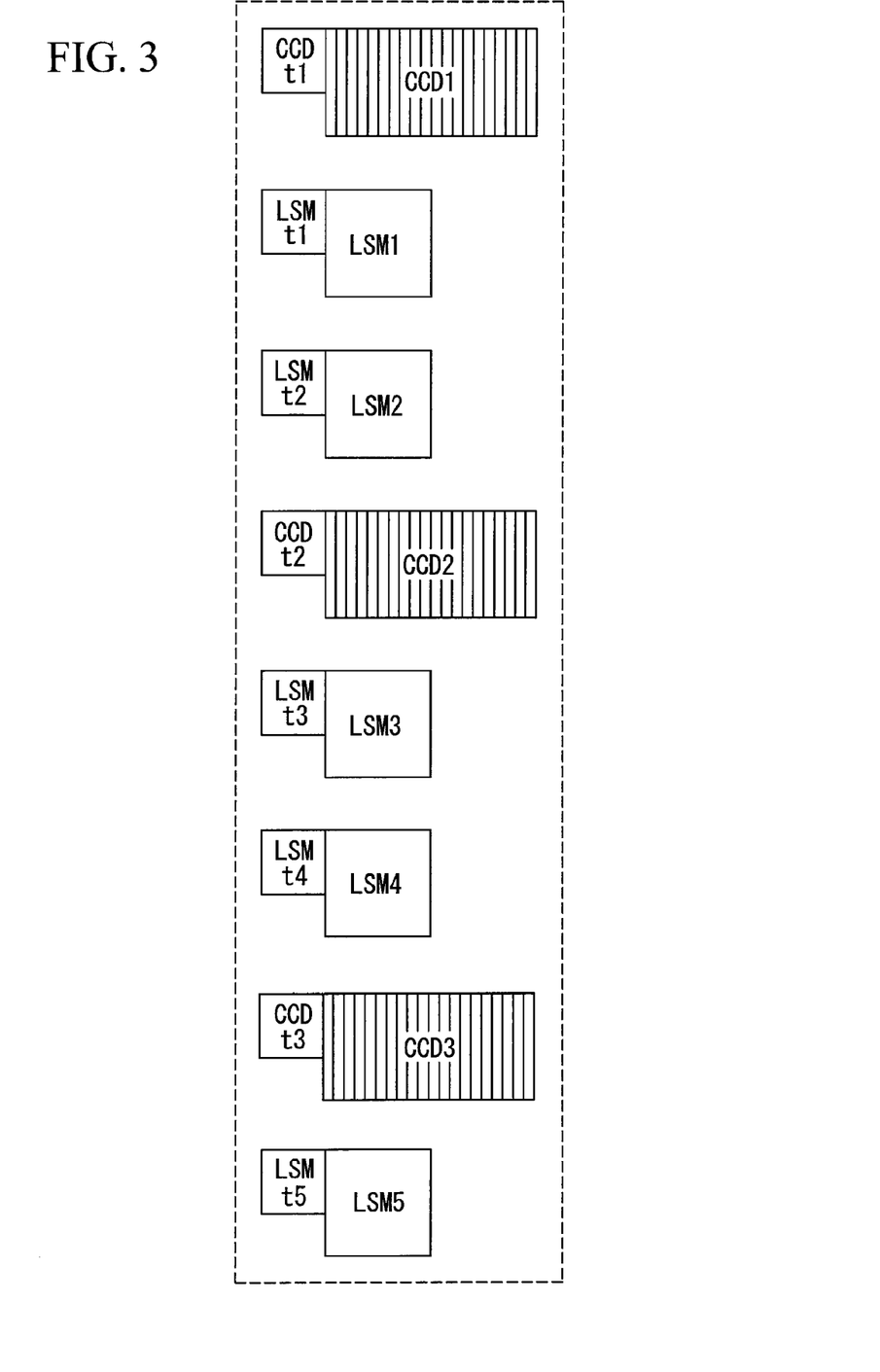
FIG. 3 shows an example of the method for storing image information acquired in accordance with the time chart of FIG. 2.

As shown in FIG. 3, the storage unit 9 stores pairs of timing information t and image information which have been associated by the control unit 5, in an arrangement according to the order of the timing information. In this case, it is sufficient only if the timing information contains information which indicates the time counted by the timer 8 from the start of the observation.

The input unit 6 comprises a keyboard, a mouse, a joystick, or the like, which are handled by the user. It is possible for the user, by handling the input unit 6, to make a command to start the observation and a command to specify a certain image displayed on the monitor 7.

Moreover, when a particular image is specified by the user through the input unit 6, the control unit 5 reads out a piece of timing information stored in relation with the specified piece of image information, then retrieves nearby piece(s) of timing information which is(are) close to the read out piece of timing information, and reads out piece(s) of a different type of image information stored in relation with the concerned nearby piece(s) of timing information, and displays it(them) on the monitor 7. By so doing, different type of image(s) related with the specified image can be displayed.

Hereunder is a description of the operation of the thus configured microscope apparatus 1 according to this embodiment.

Figure 4:
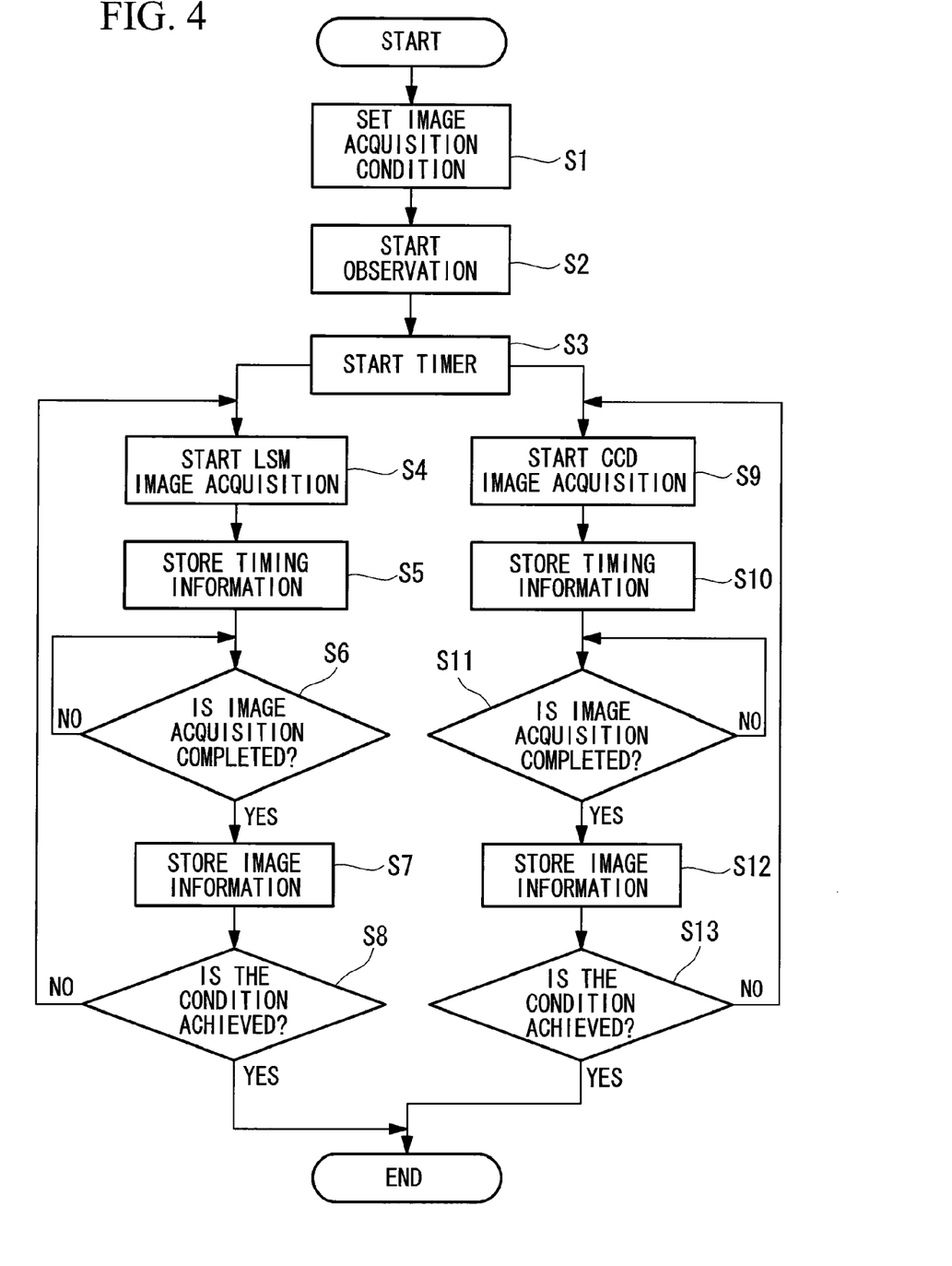
FIG. 4 is a flowchart which describes the procedure of the image acquisition by the microscope apparatus of FIG. 1.

In order to observe the specimen A by using the microscope apparatus 1 of this embodiment, as shown in FIG. 4, firstly, the user handles the input unit 6 to set the acquisition conditions for LSM image and the acquisition conditions for CCD images (step S1). The acquisition conditions can be exemplified by the range of the oscillation angle of the scanner 11 which serves as the range of acquisition for LSM images, the timing to acquire LSM images (interval), the number of LSM images to be acquired, the timing to acquire CCD images (interval), the number of CCD images to be acquired, and the like.

Next, the user handles the input unit 6 to make a command to start the observation (step S2), by which the timer 8 starts to count the time (step S3, t=0 in FIG. 2), and the acquisitions of LSM images and CCD images according to the respective acquisition conditions are started in parallel.

LSM images are acquired by operating the laser light source 10 to emit a laser beam, and moving the laser beam irradiated on the specimen A through the scanner 11 and the object lens 12 to thereby scan the specimen A in a two dimensional manner by the operation of the scanner 11. In the specimen A irradiated with the laser beam, fluorescent substances are excited to generate fluorescent light. The generated fluorescent light is collected by the object lens 12. The returning light on the way back through the dichroic mirrors 17 and 18 and the scanner 11 is branched by the dichroic mirror 13. The branched light is condensed by the condenser lens 14. The light passing through the confocal pinhole 15 is detected by the photodetector 16.

When the acquisition of LSM images is started (step S4), the timing information read out by the timer 8 at the same time of the image acquisition is stored in the storage unit 9 (step S5). Thereafter, time is allowed until the acquisition of LSM images is completed (step S6), and the image information regarding the acquired LSM images is stored in association with the timing information stored in the step S5 (step S7). Then, it is determined whether or not a predetermined number of LSM images according to the acquisition condition have been acquired (step S8). If the number is not achieved, the steps S4 to S8 are repeated again. If the predetermined number of LSM images have been acquired, the process is completed.

On the other hand, CCD images are acquired by operating the planar illumination light source 3 to irradiate the specimen A with planar illumination light through the object lens 12. Fluorescent substances existing in the specimen A are excited by the irradiation of the planar illumination light, and thereby fluorescent light is generated. The generated fluorescent light is collected by the object lens 12 and captured by the CCD.

When the acquisition of CCD images is started (step S9), the timing information read out by the timer 8 at the same time of the image acquisition is stored in the storage unit 9 (step S10). Thereafter, time is allowed until the acquisition of CCD images is completed (step S11), and the image information regarding the acquired CCD images is stored in association with the timing information stored in the step S10 (step S12). Then, it is determined whether or not a predetermined number of CCD images according to the acquisition condition have been acquired (step S13). If the number is not achieved, the steps S9 to S13 are repeated again. If the predetermined number of CCD images have been acquired, the process is completed.

In this way, according to the microscope apparatus 1 of this embodiment, different types of image information acquired by different image acquisition means such as the LSM device 2 and the CCD 4 at different timings are stored in association with a same type of timing information along a single time line based on each time point when the acquisition of each image information has been started. Therefore, even if image information is individually acquired at totally unrelated acquisition timings, such as the manner of the LSM device 2 and the CCD 4, the acquired image information can be readily observed in a chronological order afterward.

In addition, according to the microscope apparatus 1 of this embodiment, for example, upon the observation of CCD images by sequentially displaying them on the monitor 7, when the user specifies a particular CCD image by handling the input unit 6, the control unit 5 reads out a piece of timing information stored in association with the specified CCD image, from the storage unit 9, and retrieves LSM image(s) whose timing information is close to the readout peace of timing information in the storage unit 9. Then, the control unit 5 displays the retrieved LSM image(s) on the monitor 7.

For example, in the example shown in FIG. 2, when a CCD image (CCD2) is specified as the image information, a piece of timing information (CCDt2) associated with the concerned image (CCD2) is read out. Then, the control unit 5 retrieves pieces of timing information (LSMt2 and LSMt3) close to this piece of timing information (CCDt2), and displays LSM images (LSM2 and LSM3) associated with them, on the monitor 7.

By so doing, an advantage is given in which: if the specimen A makes some change, the detail of which is particularly desired to be observed, during the observation of the entire specimen A by CCD images, or in such a situation, LSM image(s) which is(are) the closest to the concerned time point is(are) displayed on the monitor 7 so that the specimen A can be observed more in detail.

This embodiment is designed to specify a CCD image displayed on the monitor 7 so as to call up nearby LSM image(s). However, instead of this, it is also possible to specify an LSM image displayed on the monitor 7 so as to call up nearby CCD image(s).

Figure 5:
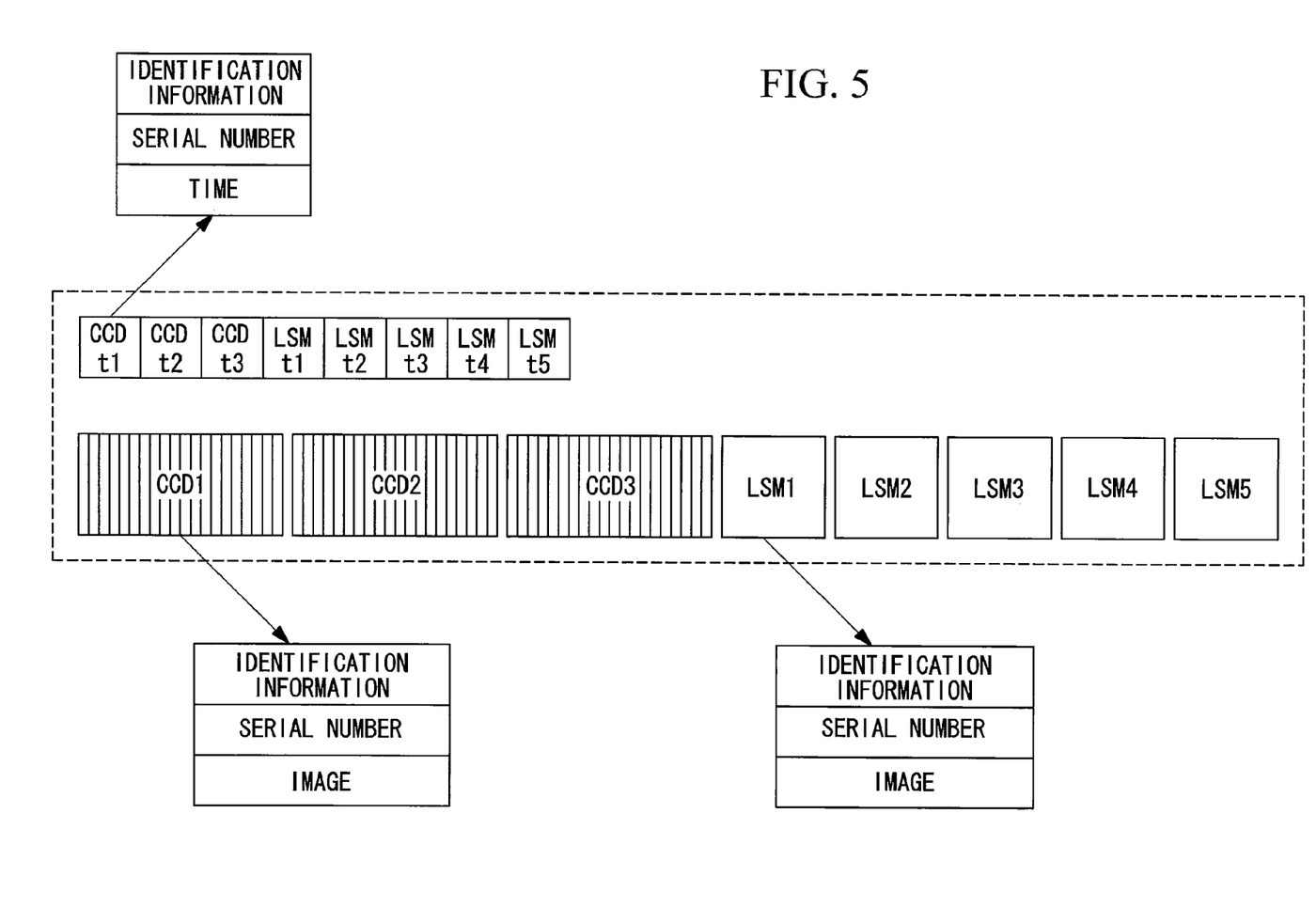
FIG. 5 shows a modified example of the method for storing image information.

Moreover, in this embodiment, the storage unit 9 stores associated pairs of timing information counted by the timer 8 and either LSM image or CCD image. However, instead of this, as shown in FIG. 5, the storage unit 9 may also collectively store pieces of timing information and collectively store pieces of image information, respectively. In this case, in order to associate the timing information and the image information with each other, it is necessary to store them by respectively providing each piece of the timing information and the image information with each serial number indicating the chronological order and each identification information indicating the type of the image, that is, whether the information is of an LSM image or a CCD image.

Figure 6:
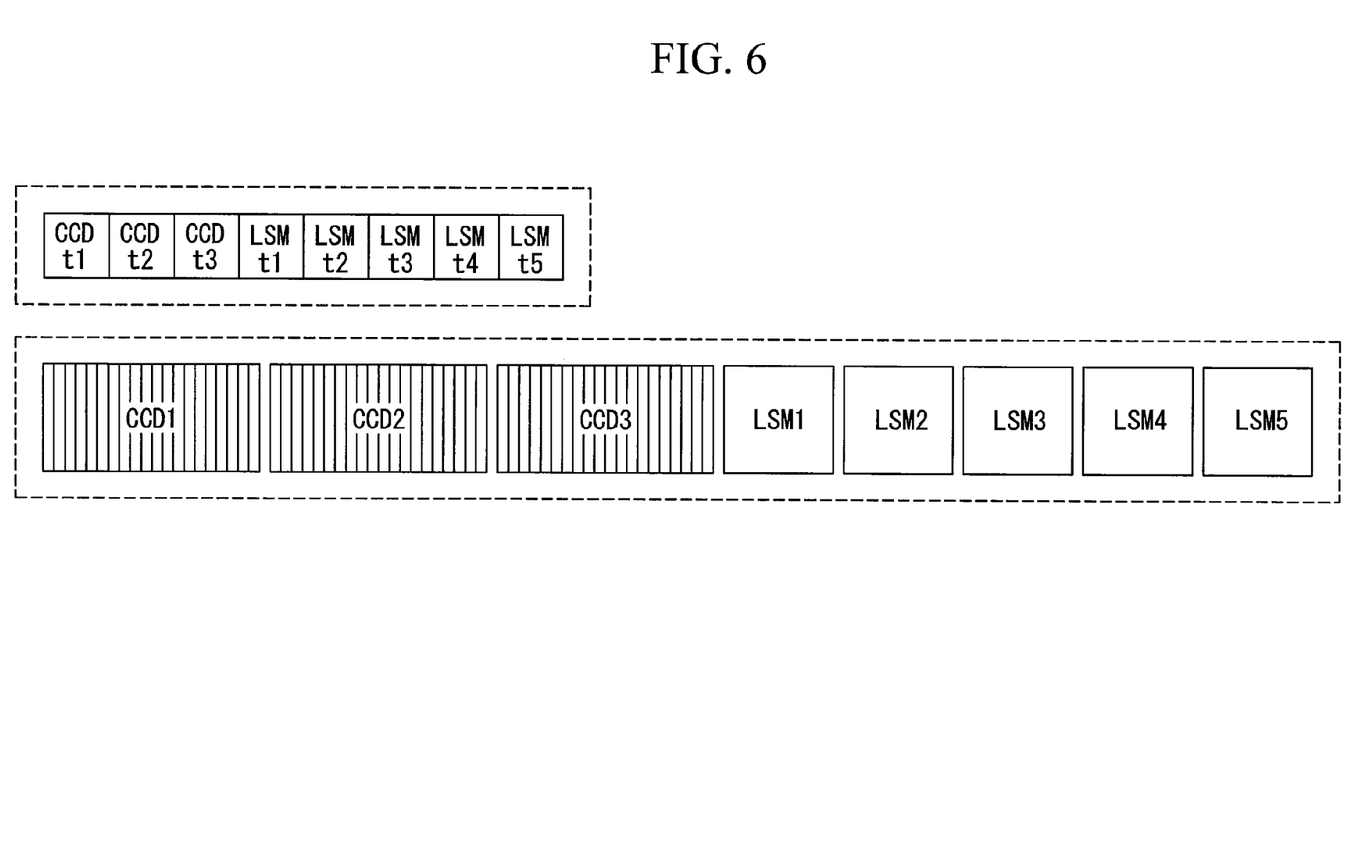
FIG. 6 shows another modified example of the method for storing image information.
Figure 7:
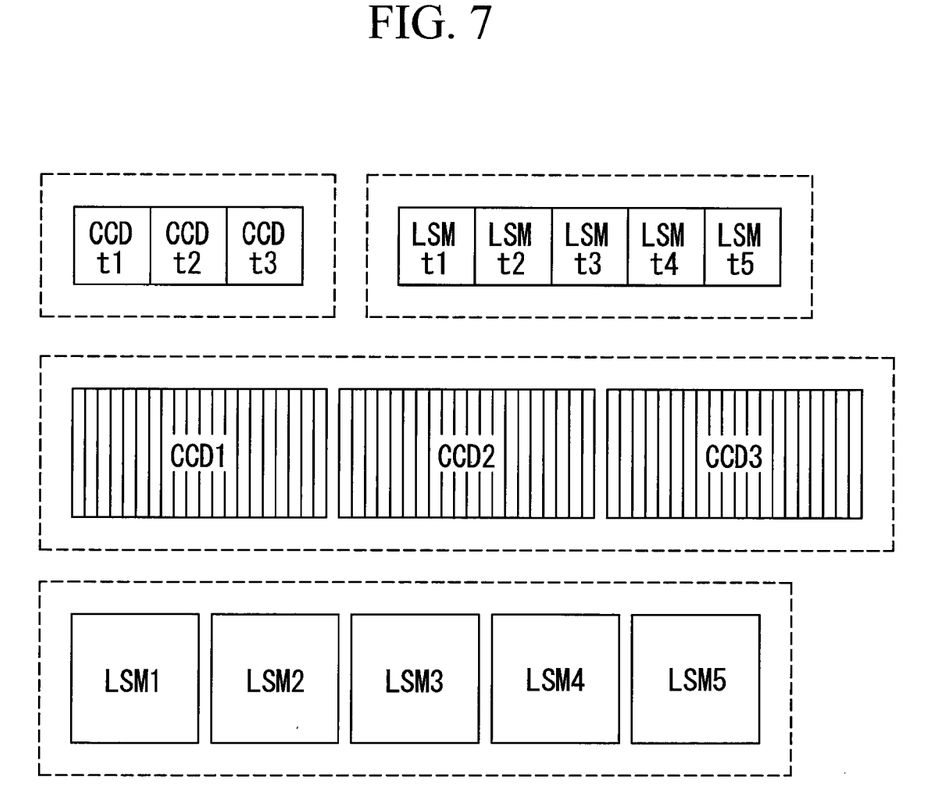
FIG. 7 shows yet another modified example of the method for storing image information.

In addition, if the identification information and the serial number are stored in respective association with the timing information and the image information in such a manner, it is also possible as shown in FIG. 6 to store the timing information and the image information in separate files. Furthermore, it is also possible as shown in FIG. 7 to respectively store the timing information associated with LSM images, the timing information associated with CCD images, the LSM image information, and the CCD image information in separate files. Moreover, all pieces of the timing information and the image information may also be stored in separate files.

In addition, although the CCD and the PMT are exemplified as the image acquisition units, the image acquisition units are not limited to them. It is also possible to employ any other types of image acquisition units having different image acquisition methods. For example, a CMOS or resonant scanner may be employed instead of the CCD.

What is claimed is:

1. A microscope apparatus comprising:
   a time counting unit which counts time,
   an object lens which collects an observation light from a specimen,
   a plurality of different image acquisition units each of which detects the observation light collected by the object lens and individually generates an observation image,
   a storage unit which, when image information is acquired by any one of the plurality of different image acquisition units, stores the image information in association with a corresponding timing information counted by said time counting unit,
   an image display unit which displays said image information,
   an image specifying unit which specifies a first image information acquired by a first one of the plurality of different image acquisition units for display on the image display unit, and
   an image retrieval unit which retrieves (i) a first timing information stored in association with the first image information specified by the image specifying unit, wherein the first timing information is a time when the first image information is acquired by detecting the observation light from the specimen, (ii) a second timing information which is stored in association with a second image information acquired by a second one of the plurality of different image acquisition units and which is closest in time to the retrieved first timing information, wherein the second timing information is a time when the second image information is acquired by detecting the observation light from the specimen, and (iii) the second image information stored in association with the retrieved second timing information,
   wherein said image display unit displays the second image information retrieved by said image retrieval unit.

2. The microscope apparatus according to claim 1, wherein said storage unit separately stores the image information acquired by said plurality of different image acquisition units and the corresponding timing information counted by said time counting unit, by respectively providing each acquired image information and each timing information with a serial number and identification information which indicates a type of image acquisition unit that has acquired corresponding image information.

3. The microscope apparatus according to claim 1, wherein said storage unit collectively stores the image information acquired by said plurality of different image acquisition units, and collectively stores the corresponding timing information counted by said time counting unit, by respectively providing each acquired image information and each timing information with a serial number and identification information which indicates a type of image acquisition unit that has acquired corresponding image information.

4. The microscope apparatus according to claim 1, wherein said storage unit stores pairs of the image information acquired by said plurality of different image acquisition units and the corresponding timing information counted by said time counting unit in an arrangement order according to the timing information.

5. The microscope apparatus according to claim 1, wherein the first one of the plurality of different image acquisition units is a laser scanning microscope device including a scanner that moves a laser beam to two-dimensionally scan the specimen, and the second one of the plurality of different image acquisition units is a charge coupled device that acquires the observation light by illuminating a surface of the specimen.

6. The microscope apparatus according to claim 1, wherein for each of said plurality of different image acquisition units, said storage unit collectively stores the image information acquired by the image acquisition unit, and collectively stores the corresponding timing information counted by said time counting unit, by respectively providing each acquired image information and each timing information with a serial number and identification information which indicates a type of image acquisition unit that has acquired corresponding image information.

* * * * *